US012465656B1

(12) United States Patent
Blair et al.

(10) Patent No.: US 12,465,656 B1
(45) Date of Patent: Nov. 11, 2025

(54) METHODS OF REDUCING COGNITIVE IMPAIRMENT AND LEARNING AND MEMORY DEFICITS CAUSED BY A P301L MUTATION IN MICROTUBULE-ASSOCIATED PROTEIN TAU (MAPT) PROTEIN IN PATIENTS WITH ALZHEIMER'S DISEASE USING AN AAV9 VECTOR ENCODING A PHOSPHOMIMETIC (S/D) HSP22 MUTANT

(71) Applicant: University of South Florida, Tampa, FL (US)

(72) Inventors: Laura Jenelle Blair, Tampa, FL (US); Paula C. Bickford, Tampa, FL (US)

(73) Assignee: University of South Florida, Tampa, FL (US)

(*) Notice: Subject to any disclaimer, the term of this patent is extended or adjusted under 35 U.S.C. 154(b) by 197 days.

(21) Appl. No.: 17/179,846

(22) Filed: Feb. 19, 2021

Related U.S. Application Data

(60) Provisional application No. 62/979,887, filed on Feb. 21, 2020.

(51) Int. Cl.
| | |
|---|---|
| *A61K 48/00* | (2006.01) |
| *A61K 38/00* | (2006.01) |
| *A61K 38/16* | (2006.01) |
| *A61K 38/17* | (2006.01) |
| *A61P 25/00* | (2006.01) |
| *A61P 25/28* | (2006.01) |
| *C07K 14/00* | (2006.01) |
| *C07K 14/435* | (2006.01) |
| *A61K 39/00* | (2006.01) |

(52) U.S. Cl.
CPC .......... *A61K 48/0066* (2013.01); *A61K 38/17* (2013.01); *A61K 48/00* (2013.01); *A61K 48/0058* (2013.01); *A61K 48/0075* (2013.01); *A61P 25/00* (2018.01); *A61P 25/28* (2018.01); *A61K 38/00* (2013.01); *A61K 38/16* (2013.01); *A61K 39/001176* (2018.08); *C07K 14/435* (2013.01)

(58) Field of Classification Search
CPC ...... A61P 25/00; A61P 25/28; A61K 38/1709; A61K 38/17; A61K 48/00; A61K 48/005; A61K 48/0058; A61K 48/0066; A61K 48/0075; A61K 38/18; A61K 38/1703; C07K 14/47; C07K 14/00; C07K 14/4711; C07K 14/4702
See application file for complete search history.

(56) References Cited

U.S. PATENT DOCUMENTS

| | | | | |
|---|---|---|---|---|
| 8,609,416 | B2 * | 12/2013 | Barnett | C07K 14/475 435/405 |
| 10,034,915 | B2 * | 7/2018 | Steinman | A61K 38/17 |
| 2007/0101447 | A1 | 5/2007 | De Jonghe et al. | |
| 2011/0047631 | A1 * | 2/2011 | Mivechi | A61P 25/16 800/9 |
| 2013/0071392 | A1 * | 3/2013 | Steinman | C07K 14/47 424/134.1 |
| 2013/0209549 | A1 * | 8/2013 | Dickey | A61K 38/17 514/17.7 |

OTHER PUBLICATIONS

HSP22 from MESH of NCBI website: www.ncbi.nlm.nih.gov/mesh/67413214 retrieved on Sep. 10, 2022.*
The Factsheet of rTg4510 mice from ALZFORUM website: www.alzforum.org/research-models/rtgtaup30114510 retrieved on Sep. 10, 2022.*
Henstridge et al. Nat. Rev. Neurosci. 2019; 20: 94-107.*
Swerdlow, Clin. Interv. Ageing 2007; 2:347-359.*
Atwood et al., J. Alzheimer's Disease; 2015; 47:33-47.*
Dujardin et al., Neuropathol. Appl. Neurobiol. 2015; 41:59-80, doi:10.1111/nan.12200.*
Tayebati, Mech. Ageing Dev. 2006. 127: 100-8.*
Sarter, Neurosci. and Biobehav. Rev. 2004. 28: 645-650.*
Falkenburger et al., J. Neural. Transm, 2006; 70:261-268.*
Burgess et al. J of Cell Bio. 1990, 111:2129-2138.*
Pawson et al. 2003, Science 300:445-452.*
Alaoui-Ismaili et al., Cytokine Growth Factor Rev. 2009; 20:501-507.*
Guo et al., PNAS 2004; 101:9205-9210.*
Gamache et al. Nat. Commun.(2019) 10:2479 | https://doi.org/10.1038/s41467-019-10428-1.*
Webster et al. Intl. J. Mol. Sci. Jul. 30, 2020 ; 21:5442. doi.10.3390/ijms21155442.*
Gamache et al. Nat Commun.2019; 10:2479. Doi.org/10.1038/s41467-019-10428.*
Jankowsky et al. Mol. Neurodeg.2017; 12:89. DOI 10.1186/s13024-107-231-7.*
Ma et al. J. Am. Heart Assoc.2019;8:e010866. DOI:10.1161/JAHA.118.010866.*
Mirra et al. J. Neuropathol. Exp. Neurol. 1999; 58:335-345.*
Bakthisaran, Raman et al., Small heat shock proteins: Role in cellular functions and pathology. Biochimoca et Biophysica Acta, 2015. 1854(4): p. 291-319.
Morrow, Genevieve and Robert M. Tanguary, *Drosophila melanogaster* Hsp22: a mitochondrial small heat shock protein influencing the aging process. Frontiers in Genetics, Mar. 16, 2015. vol. 6, Article 103 p. 1-7.
Ojha, Juhi et al., Sequestration of toxic oligomers by HspB1 as a cytoprotective mechanism. Mol Cell Biol, Aug. 2011. 31(15): p. 3146-57.

(Continued)

*Primary Examiner* — Chang-Yu Wang
(74) *Attorney, Agent, or Firm* — Michele L. Lawson; Shumaker, Loop & Kendrick, LLP

(57) ABSTRACT

A method of improving cognition, learning and memory in a patient having a tauopathy neurodegenerative disease by the administration of small heat shock protein 22 (Hsp22) is presented. Administration of both wild type Hsp22 and a mutant phosphomimetic Hsp22 were found to increase synaptic plasticity and long term potentiation thus leading to increases in cognition, learning and memory in patients having a tauopathy such as Alzheimer's disease. These increases were found to be independent of tau accumulation and phosphorylation in vivo.

15 Claims, 6 Drawing Sheets

Specification includes a Sequence Listing.

(56) References Cited

OTHER PUBLICATIONS

Bruinsma, Ilona B. et al., Inhibition of alpha-synuclein aggregation by small heat shock proteins. Proteins, 2011. 79(10): p. 2956-67.

Abisambra, Jose F. et al., Phosphorylation dynamics regulate Hsp27-mediated rescue of neuronal plasticity deficits in tau transgenic mice. J Neurosci, Nov. 17, 2010. 30(46): p. 15374-82.

Wilhelmus, Micha M.M. et al., Small heat shock protein HspB8: its distribution in Alzheimer's disease brains and its Inhibition of amyloid-beta protein aggregation and cerebrovascular amyloid-beta toxicity. Acta Neuropathol, 2006. 111(2): p. 139-49.

Shimura, Hideki et al., Binding of tau to heat shock protein 27 leads to decreased concentration of hyperphosphorylated tau and enhanced cell survival. J Biol Chem, Apr. 23, 2004. 279(17): p. 17957-62.

Miyata, Yoshinari et al., Molecular chaperones and regulation of tau quality control: strategies for drug discovery in tauopathies. Future Med Chem, Sep. 2011. 3(12): p. 1523-37.

Latchman, David S., Protective effect of heat shock proteins in the nervous system. Curr Neurovasc Res, 2004. 1(1): p. 21-7.

Sharp, Frank R. et al., Heat shock proteins in the brain: role of Hsp70, Hsp 27, and HO-1 (Hsp32) and their therapeutic potential. Transl Stroke Res, Dec. 1, 2013. 4(6): p. 685-92.

Carra, Serena et al., HspB8 and Bag3: a new chaperone complex targeting misfolded proteins to macroautophagy. Autophagy, Feb. 16, 2008. 4(2): p. 237-9.

Shemetov, Anton A. et al., Phosphorylation of human small heat shock protein HspB8 (Hsp22) by ERK1 protein kinase. Mol Cell Biochem, 2011. 355(1-2): p. 47-55.

Dabbaghizadeh, Afrooz et al. Identification of proteins interacting with the mitochondrial small heat shock protein Hsp22 of *Drosophila melanogaster*: Implication in mitochondrial homeostasis. PloS one 13.3 (Mar. 6, 2018).

Mok, Sue-Ann et al. Mapping interactions with the chaperone network reveals factors that protect against tau aggregation. Nature structural & molecular biology. Author manuscript; 25(5) (May 2018): 384-393.

Blair, Laura J. et al. Potential synergy between Tau aggregation inhibitors and Tau chaperonemodulators. Alzheimer's research & therapy 5:14 (2013).

Webster, Jack M. et al. Small heat Shock proteins, big impact on protein aggregation in neurodegenerative disease. Frontiers in Pharmacology. vol. 10, Article 1047 (Sep. 2019).

Hu, Shuxin et al. Exercise can increase small heat shock proteins (sHSP) and pre-and post-synaptic proteins in the hippocampus. Brain research 1249 (Jan. 16, 2009): 191-201.

Dickey, Chad et al., Aging analysis reveals slowed tau turnover and enhanced stress response in a mouse model of tauopathy. Am J Pathol, Jan. 2009. 174(1): p. 228-38.

Othman, M.Z. et al. Morris water maze: a versatile and pertinent tool for assessing spatial learning and memory. Exp. Anim. 71(3), 264-280, 2022.

Kim, Maria V. et al. Some properties of human small heat shock protein Hsp22 (H11 or HspB8). Biochemical and Biophysical Research Communications 315 (2004), pp. 796-801.

\* cited by examiner

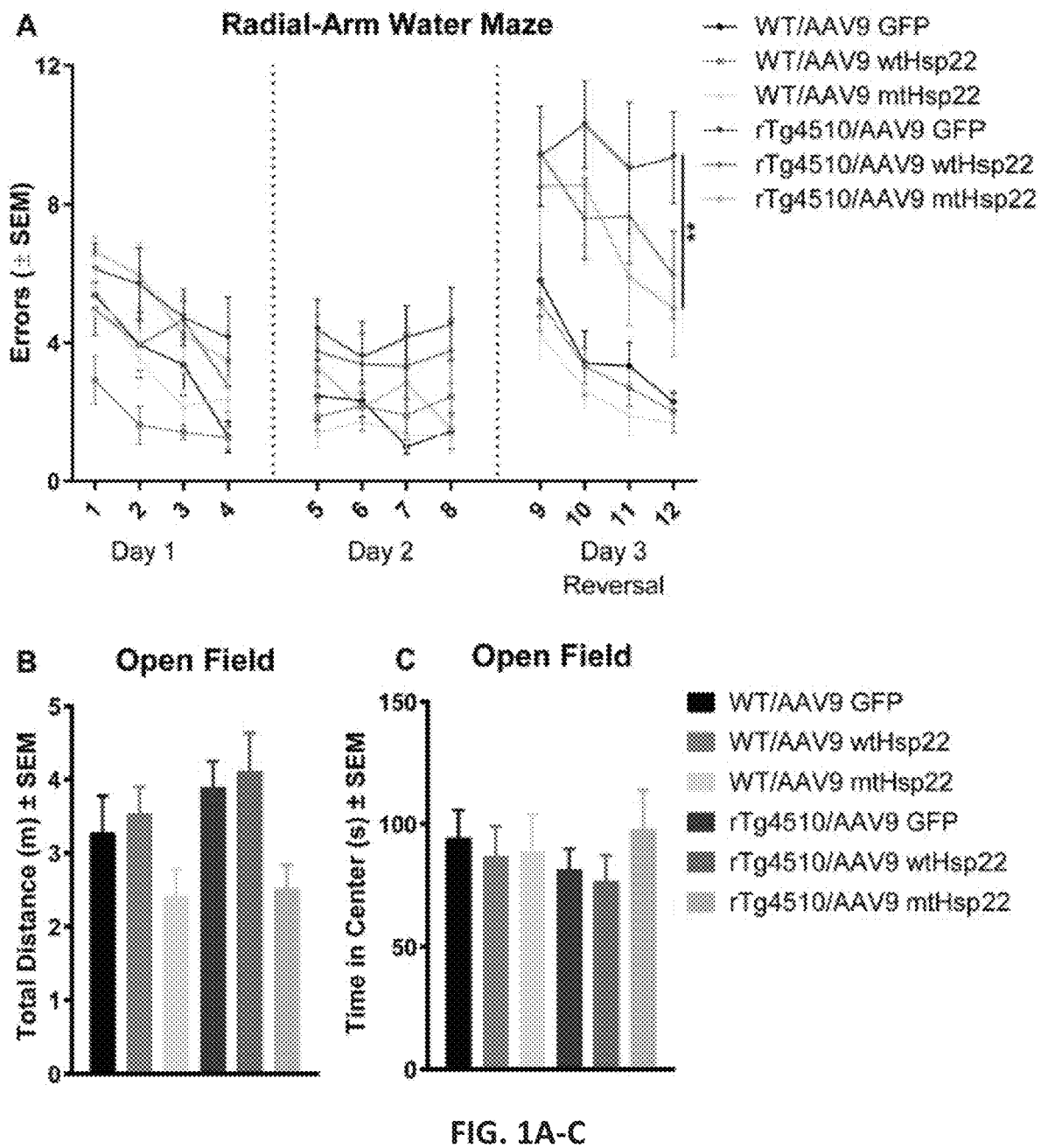
FIG. 1A-C

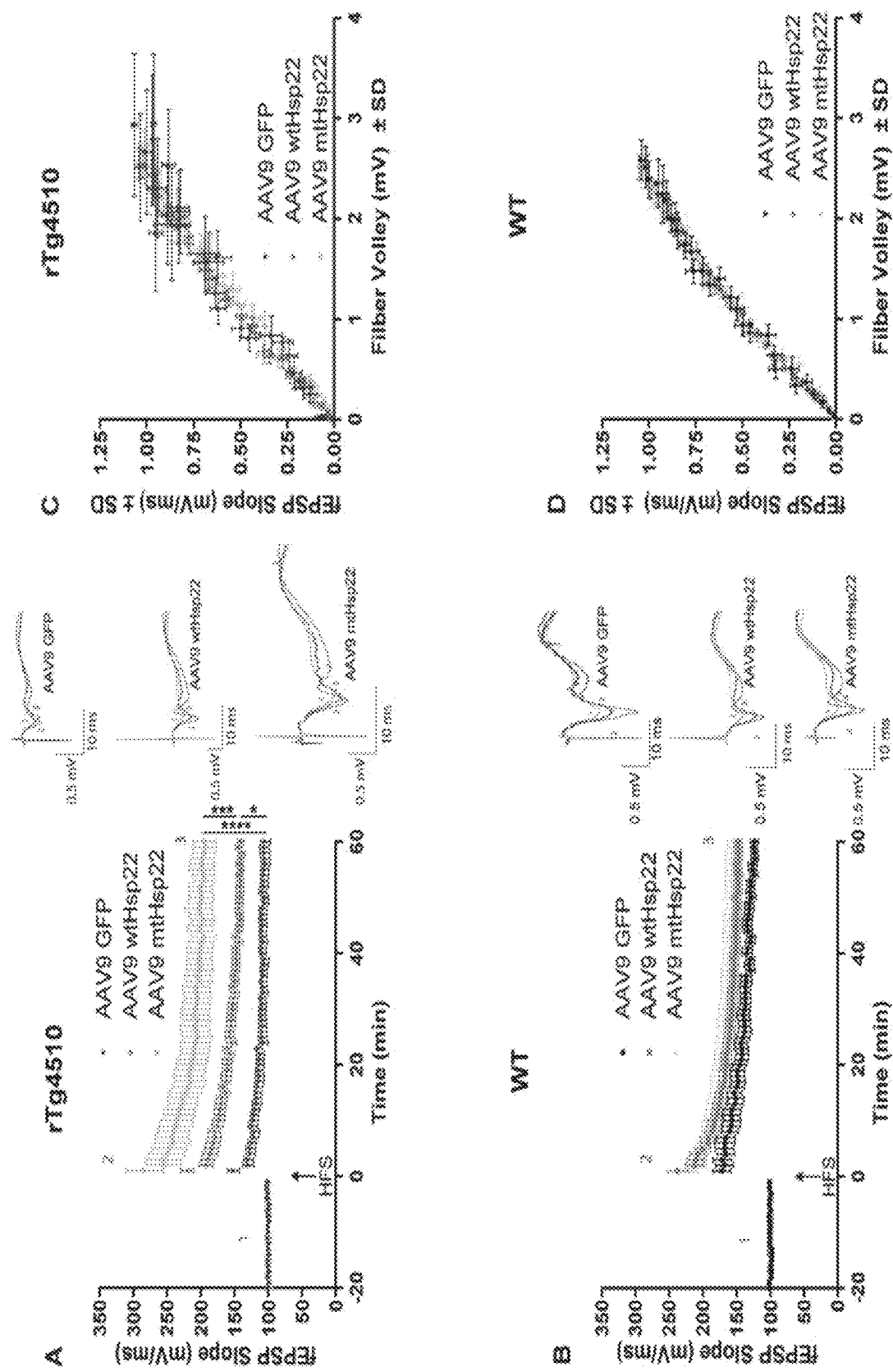
FIG. 2A-D

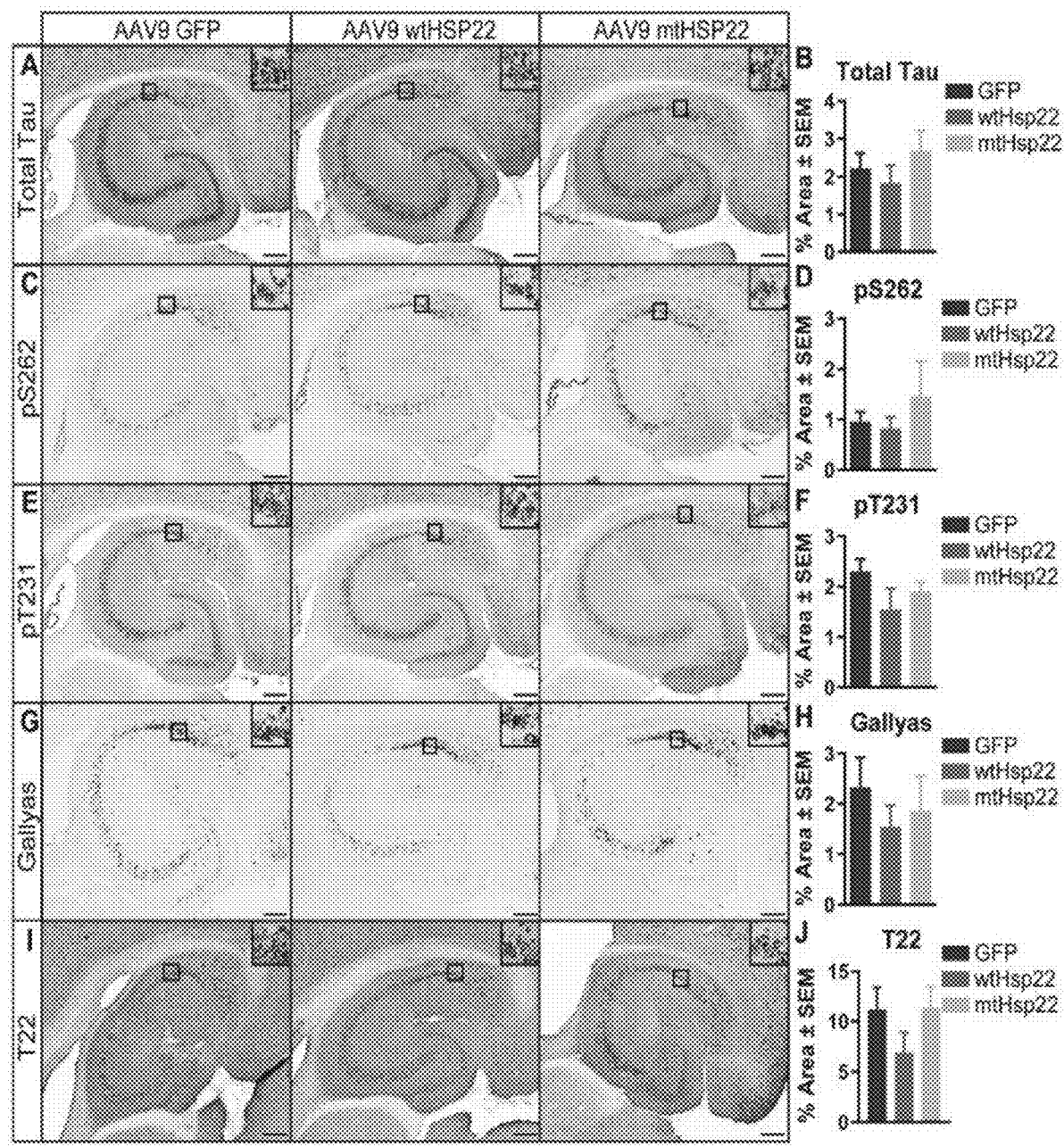
FIG. 3A-J

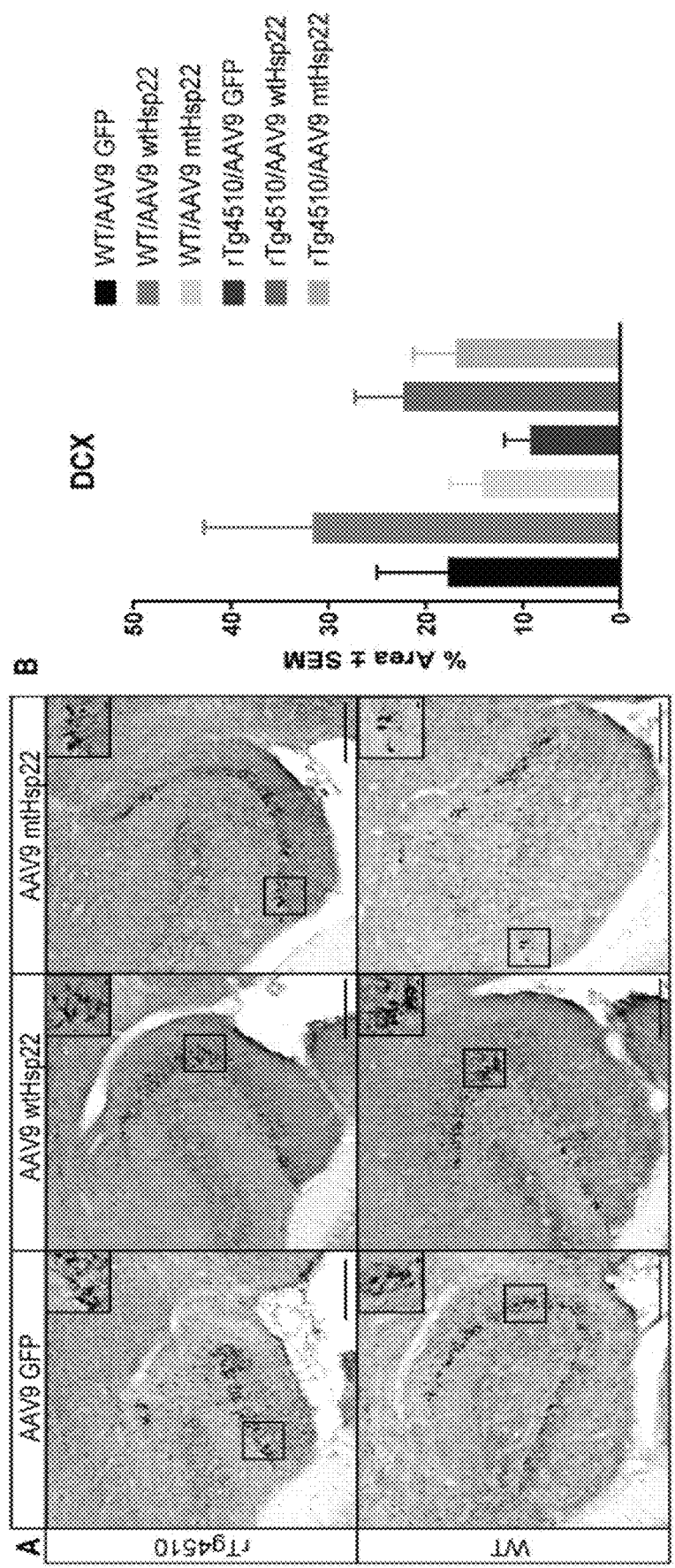
FIG. 4A-B

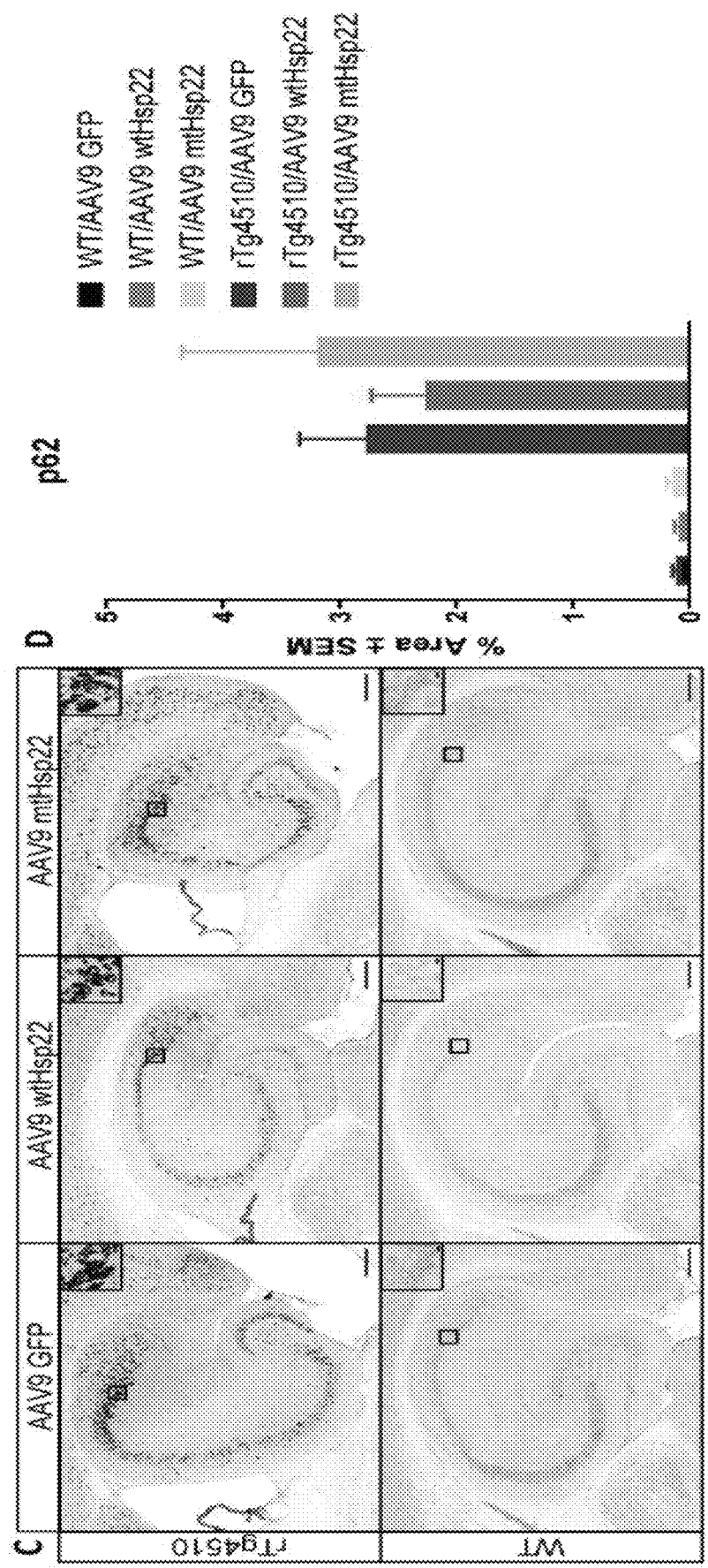
FIG. 4C-D

SEQUENCE LISTING

```
<160> NUMBER OF SEQ ID NOS: 2

<210> SEQ ID NO 1
<211> LENGTH: 196
<212> TYPE: PRT
<213> ORGANISM: homo sapiens

<400> SEQUENCE: 1

Met Ala Asp Gly Gln Met Pro Phe Ser Cys His Tyr Pro Ser Arg Leu
1               5                   10                  15

Arg Arg Asp Pro Phe Arg Asp Ser Pro Leu Ser Ser Arg Leu Leu Asp
                20                  25                  30

Asp Gly Phe Gly Met Asp Pro Phe Pro Asp Asp Leu Thr Ala Ser Trp
            35                  40                  45

Pro Asp Trp Ala Leu Pro Arg Leu Ser Ser Ala Trp Pro Gly Thr Leu
    50                  55                  60

Arg Ser Gly Met Val Pro Arg Gly Pro Thr Ala Thr Ala Arg Phe Gly
65                  70                  75                  80

Val Pro Ala Glu Gly Arg Thr Pro Pro Phe Pro Gly Glu Pro Trp
                85                  90                  95

Lys Val Cys Val Asn Val His Ser Phe Lys Pro Glu Glu Leu Met Val
                100                 105                 110

Lys Thr Lys Asp Gly Tyr Val Glu Val Ser Gly Lys His Glu Glu Lys
            115                 120                 125

Gln Gln Glu Gly Gly Ile Val Ser Lys Asn Phe Thr Lys Lys Ile Gln
    130                 135                 140

Leu Pro Ala Glu Val Asp Pro Val Thr Val Phe Ala Ser Leu Ser Pro
145                 150                 155                 160

Glu Gly Leu Leu Ile Ile Glu Ala Pro Gln Val Pro Pro Tyr Ser Thr
                165                 170                 175

Phe Gly Glu Ser Ser Phe Asn Asn Glu Leu Pro Gln Asp Ser Gln Glu
                180                 185                 190

Val Thr Cys Thr
            195

<210> SEQ ID NO 2
<211> LENGTH: 196
<212> TYPE: PRT
<213> ORGANISM: artificial sequence
<220> FEATURE:
<223> OTHER INFORMATION: synthetic sequence

<400> SEQUENCE: 2

Met Ala Asp Gly Gln Met Pro Phe Ser Cys His Tyr Pro Ser Arg Leu
1               5                   10                  15

Arg Arg Asp Pro Phe Arg Asp Asp Pro Leu Ser Ser Arg Leu Leu Asp
                20                  25                  30

Asp Gly Phe Gly Met Asp Pro Phe Pro Asp Asp Leu Thr Ala Ser Trp
```

-continued

```
                35                  40                  45
Pro Asp Trp Ala Leu Pro Arg Leu Asp Ser Ala Trp Pro Gly Thr Leu
    50                  55                  60

Arg Ser Gly Met Val Pro Arg Gly Pro Thr Ala Thr Ala Arg Phe Gly
65                  70                  75                  80

Val Pro Ala Glu Gly Arg Thr Pro Pro Phe Pro Gly Glu Pro Trp
                85                  90                  95

Lys Val Cys Val Asn Val His Ser Phe Lys Pro Glu Glu Leu Met Val
            100                 105                 110

Lys Thr Lys Asp Gly Tyr Val Glu Val Ser Gly Lys His Glu Glu Lys
        115                 120                 125

Gln Gln Glu Gly Gly Ile Val Ser Lys Asn Phe Thr Lys Lys Ile Gln
    130                 135                 140

Leu Pro Ala Glu Val Asp Pro Val Thr Val Phe Ala Ser Leu Ser Pro
145                 150                 155                 160

Glu Gly Leu Leu Ile Ile Glu Ala Pro Gln Val Pro Pro Tyr Ser Thr
                165                 170                 175

Phe Gly Glu Ser Ser Phe Asn Asn Glu Leu Pro Gln Asp Ser Gln Glu
            180                 185                 190

Val Thr Cys Thr
        195
```

METHODS OF REDUCING COGNITIVE IMPAIRMENT AND LEARNING AND MEMORY DEFICITS CAUSED BY A P301L MUTATION IN MICROTUBULE-ASSOCIATED PROTEIN TAU (MAPT) PROTEIN IN PATIENTS WITH ALZHEIMER'S DISEASE USING AN AAV9 VECTOR ENCODING A PHOSPHOMIMETIC (S/D) HSP22 MUTANT

CROSS REFERENCE TO RELATED APPLICATIONS

This application is a nonprovisional of and claims priority to U.S. Provisional Application No. 62/979,887 entitled "sHsp22 Improves Cognition and Learning Independently of Tau", filed Feb. 21, 2020, the contents of which are hereby incorporated by reference into this disclosure.

FEDERALLY SPONSORED RESEARCH OR DEVELOPMENT

This invention was made with government support under Grant No. RF1AG055088 awarded by the National Institute of Health. The Government has certain rights in the invention.

SEQUENCE LISTING

The sequence listing entitled "Methods of Reducing Cognitive Impairment and Learning and Memory Deficits Caused by a P301L Mutation in Microtubule-Associated Protein (MAPT) Protein in Patients with Alzheimer's Disease Using an AAV9 Vector Encoding a Phosphomimetic (S/D) HSP22 Mutant" in ST.25 format, created on Oct. 3, 2025, is hereby incorporated by reference into this disclosure

FIELD OF THE INVENTION

This invention relates, generally, to treatment of neurodegenerative diseases. More specifically, it relates to the treatment of tauopathies such as Alzheimer's disease by administration of small heat shock proteins (sHsp) such as Hsp22.

BACKGROUND OF THE INVENTION

Tau is a microtubule associated protein that has been linked to multiple neurodegenerative diseases, the most prevalent being Alzheimer's disease (AD). In AD and other tauopathies, tau pathogenically aggregates, which is believed to contribute to the pathogenicity of the disease. Currently there are no effective therapies to treat patients with tauopathies, but molecular chaperones have been shown in numerous studies to regulate tau accumulation and neuronal damage.

Molecular chaperones are essential proteins that help maintain cellular homeostasis by assisting in protein folding, refolding, and degradation. Small heat shock proteins (sHsp) are highly conserved, ATP-independent molecular chaperones that are highly expressed and respond quickly to stressful conditions, like pH changes and oxidation. (Bakthisaran, R., R. Tangirala, and M. Rao Ch, *Small heat shock proteins: Role in cellular functions and pathology*. Biochim Biophys Acta, 2015. 1854(4): p. 291-319). Instead of ATP, sHsps, like Hsp22 and Hsp27, are activated through phosphorylation in their N-terminal domain and act in conjunction with other chaperones to maintain homeostasis. These sHsps have been shown to have increased expression with aging and to directly interact with autophagy-related proteins and to form complexes that help regulate aberrant proteins in the cell. (Dickey 2009; Webster 2020). Hsp22 (HSPB8) specifically has been shown to have a protective role during aging in *Drosophila* and in human cells. (Morrow, G. and R. M. Tanguay, *Drosophila melanogaster Hsp22: a mitochondrial small heat shock protein influencing the aging process*. Front Genet, 2015. 6: p. 1026).

Discrete sHsp have also been described as potent inhibitors of protein aggregation. (Bakthisaran, R., R. Tangirala, and M. Rao Ch, *Small heat shock proteins: Role in cellular functions and pathology*. Biochim Biophys Acta, 2015. 1854(4): p. 291-319). Hsp27 also known as HSPB1, has been shown to inhibit the aggregation of tau and other aggregating proteins, Aβ and α-synuclein. (Ojha, J., et al., *Sequestration of toxic oligomers by HspB1 as a cytoprotective mechanism*. Mol Cell Biol, 2011. 31(15): p. 3146-57; Shimura, H., Y. Miura-Shimura, and K. S. Kosik, *Binding of tau to heat shock protein 27 leads to decreased concentration of hyperphosphorylated tau and enhanced cell survival*. J Biol Chem, 2004. 279(17): p. 17957-62; Bruinsma, I. B., et al., *Inhibition of alpha-synuclein aggregation by small heat shock proteins*. Proteins, 2011. 79(10): p. 2956-67). The inventors previously showed that Hsp27 can slows tau accumulation in vitro and in vivo. (Abisambra, J. F., et al., *Phosphorylation dynamics regulate Hsp27-mediated rescue of neuronal plasticity deficits in tau transgenic mice*. J Neurosci, 2010. 30(46): p. 15374-82).

Hsp22 has also been shown to reduce aggregation of Aβ and α-synuclein. (Wilhelmus, M. M., et al., *Small heat shock protein HspB8: its distribution in Alzheimer's disease brains and its inhibition of amyloid-beta protein aggregation and cerebrovascular amyloid-beta toxicity*. Acta Neuropathol, 2006. 111(2): p. 139-49; Bruinsma, I. B., et al., *Inhibition of alpha-synuclein aggregation by small heat shock proteins*. Proteins, 2011. 79(10): p. 2956-67). Recently, the inventors found that Hsp22 reduces tau accumulation in vitro, but the effects of Hsp22 on tau in the brain is still unknown. (Webster 2020).

In light of the shortcomings in the area of treating tauopathies, the inventors investigated the effects of Hsp22 wild-type and Hsp22 phosphomimetic mutant overexpression in the brains of a tau transgenic mice on tau accumulation, cognitive function, synaptic plasticity, and neuronal health. Immunohistochemical analysis of the tau transgenic brain tissues revealed no significant change in total, phosphorylated, silver-positive, or oligomeric tau levels by Hsp22 overexpression compared to GFP control injected mice. However, Hsp22 overexpression improved spatial reversal learning and synaptic plasticity in tau transgenic mice, but this was further enhanced by the Hsp22 phosphomimetic mutant. Overall, Hsp22 overexpression is improving neuronal plasticity and cognition independently of changes in tau levels or phosphorylation.

SUMMARY OF THE INVENTION

As noted previously, the microtubule associated protein tau pathologically aggregates in neurodegenerative disease termed tauopathies, which includes Alzheimer's disease (AD), a progressive and irreversible dementia. Aberrant tau accumulation is thought to be a primary driver of cognitive dysfunction and neuronal loss in AD.

Molecular chaperones, like small heat shock proteins (sHsp), can help deter the accumulation of misfolded proteins, like tau. Hsp27 has been shown to reduce tau accumulation in vitro and in vivo. Hsp22 slows tau aggregation and accumulation in vitro. The inventors found overexpression of wild-type Hsp22 (wtHsp22) (SEQ ID NO: 1), and a phosphomimetic (S/D) Hsp22 mutant (mtHsp22) (SEQ ID NO: 2), preserves and improves memory in a murine model of tauopathy, rTg4510. Hsp22 preserves and improves synaptic plasticity and cognition in the tauopathic brain, independently of altering tau levels or phosphorylation status. The inventors used mass spectrometry to determine mechanisms and pathways affected by Hsp22 overexpression to explain the observed phenotypic precognitive effects.

In an embodiment, a method of improving cognition in a patient having a neurodegenerative disease characterized as a tauopathy is presented. The method comprises administering a composition comprising a therapeutically effective amount of heat shock protein 22 (Hsp22) to the patient wherein the therapeutically effective amount of the Hsp22 does not alter tau levels or tau phosphorylation status.

The Hsp22 can be phosphorylated in at least one site. In some embodiments, the Hsp22 can be a phosphomimetic mutant having at least one point mutation selected from the group consisting of S24D, S57D and combinations thereof.

The neurodegenerative disease can be selected from the group consisting of Alzheimer's disease (AD), Parkinson's disease (PD), corticobasal degeneration (CBD), progressive supranuclear palsy (PSP), sporadic frontotemporal dementia (FTD), frontotemporal lobar degeneration (FTLD), Lyticobodig disease, and Pick's Disease. In some embodiments, the neurodegenerative disease is Alzheimer's disease.

The composition can comprise a vector comprising a nucleic acid sequence encoding for the Hsp22 operatively linked to a promotor capable of expressing the Hsp22 in a suitable host cell of the patient. The vector can be an adeno-associated virus (AAV) vector.

In another embodiment, a method of increasing synaptic plasticity and long term potentiation in a patient having a neurogenerative disease characterized as a tauopathy is presented. The method comprises administering a composition comprising a therapeutically effective amount of heat shock protein 22 (Hsp22) to the patient wherein the therapeutically effective amount of the Hsp22 does not alter tau levels or tau phosphorylation status.

The Hsp22 can be phosphorylated in at least one site. In some embodiments, the Hsp22 can be a phosphomimetic mutant having at least one point mutation selected from the group consisting of S24D, S57D and combinations thereof.

The neurodegenerative disease can be selected from the group consisting of Alzheimer's disease (AD), Parkinson's disease (PD), corticobasal degeneration (CBD), progressive supranuclear palsy (PSP), sporadic frontotemporal dementia (FTD), frontotemporal lobar degeneration (FTLD), Lyticobodig disease, and Pick's Disease. In some embodiments, the neurodegenerative disease is Alzheimer's disease.

In a further embodiment, a method of improving memory in a patient having a neurodegenerative disease characterized as a tauopathy. The method comprises administering a composition comprising a therapeutically effective amount of heat shock protein 22 (Hsp22) to the patient wherein the therapeutically effective amount of the Hsp22 does not alter tau levels or tau phosphorylation status.

The Hsp22 can be phosphorylated in at least one site. In some embodiments, the Hsp22 can be a phosphomimetic mutant having at least one point mutation selected from the group consisting of S24D, S57D and combinations thereof.

The neurodegenerative disease can be selected from the group consisting of Alzheimer's disease (AD), Parkinson's disease (PD), corticobasal degeneration (CBD), progressive supranuclear palsy (PSP), sporadic frontotemporal dementia (FTD), frontotemporal lobar degeneration (FTLD), Lyticobodig disease, and Pick's Disease. In some embodiments, the neurodegenerative disease is Alzheimer's disease.

In an embodiment, a method of treating Alzheimer's disease by improving memory or improving cognition or increasing synaptic plasticity and long term potentiation in a patient having Alzheimer's disease is presented. The method comprises administering a composition comprising a therapeutically effective amount of heat shock protein 22 (Hsp22) to the patient wherein the therapeutically effective amount of the Hsp22 does not alter tau levels or tau phosphorylation status.

The Hsp22 can be phosphorylated in at least one site. In some embodiments, the Hsp22 can be a phosphomimetic mutant having at least one point mutation selected from the group consisting of S24D, S57D and combinations thereof.

BRIEF DESCRIPTION OF THE DRAWINGS

For a fuller understanding of the invention, reference should be made to the following detailed description, taken in connection with the accompanying drawings, in which:

FIG. 1A-C are a series of graphs depicting mtHSP22 overexpression rescued reversal learning and memory in rTg4510 mice. rTg4510 and wild-type mice injected with AAV9-GFP, AAV9-wtHsp22, and AAV9-mtHsp22 were trained in the 2-day Radial-Arm Water Maze with reversal. (A) Errors to find platform are shown ±SEM. The open field task was used to assess (B) locomotive activity (m)±SEM as well as anxiety-like behavior as determined by (C) time in the center (s)±SEM.

FIG. 2A-D are a series of graphs depicting Hsp22 overexpression increased hippocampal synaptic plasticity in rTg4510 mice. After recording 20 minute baseline, LTP was induced with TBS (5 bursts of 200 Hz separated by 200 ms, repeated 6 times with an intertrain interval of 10 seconds). fEPSP was recorded for 60 minutes. (A) Representative fEPSP traces for rTg4510 mice injected with AAV9-GFP (n=4), AAV9-wtHsp22 (n=4), and AAV9-mtHsp22 (n=4). Points were considered significance at (*$p<0.1$ and ****$p<0.0001$). (B) Representative fEPSP traces for WT mice injected with AAV9-GFP (n=4), AAV9-wtHsp22 (n=4), and AAV9-mtHsp22 (n=4). (C) The average Input/Output curves for rTg4510 mice injected with AAV9-GFP, AAV9-wtHsp22, and AAV9-mtHsp22. (D) The average Input/Output curves for WT mice injected with AAV9-GFP, AAV9-wtHsp22, and AAV9-mtHsp22.

FIG. 3A-J are a series of images depicting Neuronal overexpression of Hsp22 had no significant effect on tau levels or neurofibrillary tangles. Immunohistochemistry staining and quantification of the hippocampus from rTg4510 mice injected with AAV9-GFP (n=6), AAV9-wtHsp22 (n=6), AAV9-mtHsp22 (n=6) respectively for (A,B) total tau, (C,D) pS262 tau, (E,F) pT231 tau, (G,H) Gallyas silver, (I,J) T22 (oligomeric tau) (scale bar, 200 m). Statistical significance was determined with one-way ANOVA.

FIG. 4A-B are a series of images depicting Hsp22 overexpression did not change adult hippocampal neurogenesis or markers of autophagy. Immunohistochemistry staining and quantification of the hippocampus from rTg4510 and WT mice injected with AAV9-GFP (n=6 rTg4510 and n=6 WT), AAV9-wtHsp22 (n=6 rTg4510 and n=7 WT), AAV9- mtHsp22 (n=6 rTg4510 and n=6 WT) respectively for (A,B) Doublecortin (DCX). Statistical significance was determined with one-way ANOVA.

Figure 5:
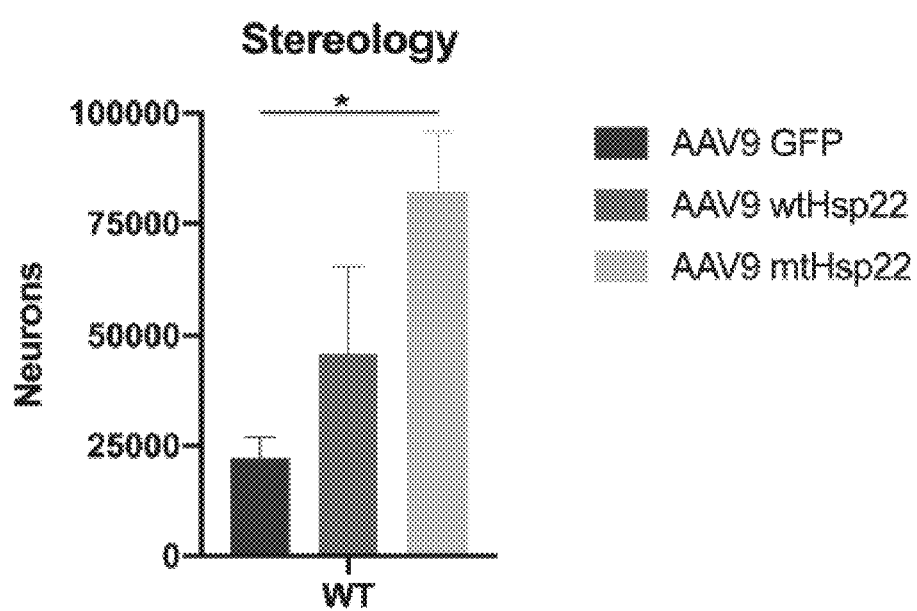

FIG. 4C-D is a series of images depicting Hsp22 overexpression did not change adult hippocampal neurogenesis or markers of autophagy. Immunohistochemistry staining and quantification of the hippocampus from rTg4510 and WT mice injected with AAV9-GFP (n=6 rTg4510 and n=6 WT), AAV9-wtHsp22 (n=6 rTg4510 and n=7 WT), AAV9-mtHsp22 (n=6 rTg4510 and n=6 WT) respectively for (C,D) p62 (scale bar represents 200 m). Statistical significance was determined with one-way ANOVA.

FIG. 5 is a graph depicting Hsp22 overexpression did not affect neuronal count in rTg4510 mice. Immunohistochemistry staining and quantification of neurons (Neun/Cresyl Violet) of the hippocampus from rTg4510 mice injected with AAV9-GFP (n=6), AAV9-wtHsp22 (n=6), AAV9-mtHsp22 (n=6), respectively (scale bar, 200 μm). Statistical significance was determined with one-way ANOVA.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

Definitions

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

All numerical designations, such as pH, temperature, time, concentration, and molecular weight, including ranges, are approximations which are varied up or down by increments of 1.0 or 0.1, as appropriate. It is to be understood, even if it is not always explicitly stated that all numerical designations are preceded by the term "about". It is also to be understood, even if it is not always explicitly stated, that the reagents described herein are merely exemplary and that equivalents of such are known in the art and can be substituted for the reagents explicitly stated herein.

Concentrations, amounts, solubilities, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include the individual values and sub-ranges within the indicated range, to the tenth of the unit. Thus, included in this numerical range are individual values such as 2, 3, and 4 and sub-ranges such as from 1-3, from 2-4 and from 3-5, etc. This same principle applies to ranges reciting only one numerical value. Furthermore, such an interpretation should apply regardless of the range or the characteristics being described.

As used herein, the term "comprising" is intended to mean that the products, compositions, and methods include the referenced components or steps, but not excluding others. "Consisting essentially of" when used to define products, compositions, and methods, shall mean excluding other components or steps of any essential significance. Thus, a composition consisting essentially of the recited components would not exclude trace contaminants and pharmaceutically acceptable carriers. "Consisting of" shall mean excluding more than trace elements of other components or steps.

As used herein, "about" means approximately or nearly and in the context of a numerical value or range set forth means±15% of the numerical.

As used herein "patient" is used to describe an animal, preferably a human, to whom treatment is administered, including prophylactic treatment with the compositions of the present invention. "Subject" and "patient" are used interchangeably herein.

As used herein "animal" means a multicellular, eukaryotic organism classified in the kingdom Animalia or Metazoa. The term includes, but is not limited to, mammals. Non-limiting examples include rodents, mammals, aquatic mammals, domestic animals such as dogs and cats, farm animals such as sheep, pigs, cows and horses, and humans. Wherein the terms "animal" or the plural "animals" are used, it is contemplated that it also applies to any animals.

"Neurodegenerative disorder" or "neurodegenerative disease" as used herein refers to any abnormal physical or mental behavior or experience where the death or dysfunction of neuronal cells is involved in the etiology of the disorder. Further, the term "neurodegenerative disease" as used herein describes neurodegenerative diseases which are associated with tauopathies. Exemplary neurodegenerative diseases include Alzheimer's disease (AD), Parkinson's disease (PD), corticobasal degeneration (CBD), progressive supranuclear palsy (PSP), sporadic frontotemporal dementia (FTD), frontotemporal lobar degeneration (FTLD), Lytico-bodig disease (Guam Parkinson-dementia complex), and Pick's Disease.

"Tauopathies" as used herein refers to a class of neurodegenerative diseases caused by misfolding of the tau protein which results in the deposition of abnormal tau (tubulin associated unit) in the brain. These aggregates form neurofibrillary tangles that can lead to neuronal toxicity and degeneration. Tauopathies can include both movement and cognitive/behavioral disorders or non-specific amnesic symptoms in advanced age.

The term "Alzheimer's disease" or "AD" as used herein refers to a condition characterized by the abnormal deposition of amyloid in the brain of a patient in the form of extra-cellular plaques and intra-cellular neurofibrillary tangles. The rate of amyloid accumulation is a combination of the rates of formation, aggregation, and egress from the brain. It is generally accepted that the main constituent of amyloid plaques is the amyloid protein (Aβ) which is a proteolytic product of a precursor protein of much larger size. The symptoms of Alzheimer's disease are similar to those of other dementias and include, but are not limited to, memory loss, changes in personality, problems using language, disorientation, difficulty doing daily activities, and disruptive behavior. As described herein, "Alzheimer's disease" refers to both sporadic and familial (genetic) forms of the disease.

The term "fronto-temporal lobar dementia" or "(FTLD)" as used herein refers to a progressive neurodegenerative disorder which is the second most common form of early-onset neurodegenerative dementia after AD. It affects between 10-20% of patients with an onset of dementia before age 65. FTLD patients present with prominent behavioral and personality changes as well as language impairment which eventually evolves into cognitive impairment and dementia.

The term "normal" or "control" as used herein refers to a sample or cells which are assessed as not having Alzheimer's disease, any other neurodegenerative disease, any other tauopathy, or any other memory deficit disorder. A control sample refers to a sample, standard or level that is used for comparison purposes. In some embodiments, the control sample may be obtained from a healthy and/or non-diseased part of the body of an individual who is not the subject. This healthy individual may be referred to as "normal" as defined herein. The terms "control sample" and "reference sample" are used interchangeably herein.

"Treatment" or "treating" as used herein refers to any of: the alleviation, amelioration, elimination and/or stabilization of a symptom, as well as delay in progression of a symptom of a particular disorder. For example, "treatment" of a neurodegenerative disease may include any one or more of the following: amelioration and/or elimination of one or more symptoms associated with the neurodegenerative disease, reduction of one or more symptoms of the neurodegenerative disease, stabilization of symptoms of the neurodegenerative disease, and delay in progression of one or more symptoms of the neurodegenerative disease.

"Administration" or "administering" is used to describe the process in which therapeutics used to treat neurodegenerative diseases considered tauopathies such as Alzheimer's disease, alone or in combination with other therapeutics, are delivered to a patient. The composition may be administered in various ways including injection into the central nervous system including the brain, including but not limited to, intrastriatal, intrahippocampal, ventral tegmental area (VTA) injection, intracerebral, intracerebellar, intramedullary, intranigral, intraventricular, intracisternal, intracranial, intraparenchymal including spinal cord and brain stem; oral; parenteral (referring to intravenous and intraarterial and other appropriate parenteral routes); intrathecal; intramuscular; subcutaneous; intracapsular; subarachnoid; subcapsular; intrasternal; and intraspinal, among others. Each of these conditions may be readily treated using other administration routes of compounds of the present invention to treat a disease or condition.

As used herein, the term "therapeutically effective amount" refers to that amount of an agent (e.g., a therapeutic agent or vector) sufficient to result in the amelioration of Alzheimer's disease or other tauopathies or one or more symptoms thereof, prevent advancement of Alzheimer's disease or other tauopathies, or cause regression of Alzheimer's disease or other tauopathies.

"Agent" as used herein refers to a composition, compound, chemical, substance, component, or vector that has measurable specified or selective physiological activity when administered to a patient in a therapeutically effective amount. The chemical can be of any composition such as inorganic, organic, or a biomolecule. A biomolecule can be a molecule of any biological origin that can be found in or produced by, at least in part, a cell. This definition includes, but is not limited to, polypeptides, lipids, nucleic acids, carbohydrates, and combinations thereof. "Agent" is used interchangeably herein with "compound", "composition", "chemical", "drug", "therapeutic", and "extract".

"Vector" as used herein refers to a nucleic acid molecule (typically comprised of DNA) capable of replication in a host cell and/or to which another nucleic acid segment can be operatively linked so as to bring about replication of the attached segment. A plasmid, cosmid, or a virus is an exemplary vector. In some embodiments, the vector is an adeno-associated viral (AAV) vector. Known AAV serotypes, include, for example, AAV serotype 1 (AAV1), AAV serotype 2 (AAV2), AAV serotype 4 (AAV4), AAV serotype 5 (AAV5), AAV serotype 6 (AAV6), AAV serotype 7 (AAV7), AAV serotype 8 (AAV8), AAV serotype 9 (AAV9), AAV serotype 10 (AAV10), AAV serotype 11 AAV11), or AAV serotype 12 (AAV12), In some embodiments, the AAV vector is AAV9.

The term "promoter," as used herein refers to a region or regions of a nucleic acid sequence that regulates transcription.

"Nucleic acid" as used herein includes one or more types of: polydeoxyribonucleotides (containing 2-deoxy-D-ribose), polyribonucleotides (containing D-ribose), and any other type of polynucleotide that is an N-glycoside of a purine or pyrimidine base, or modified purine or pyrimidine bases (including abasic sites). The term "nucleic acid," as used herein, also includes polymers of ribonucleosides or deoxyribonucleosides that are covalently bonded, typically by phosphodiester linkages between subunits, but in some cases by phosphorothioates, methylphosphonates, and the like. "Nucleic acids" include single- and double-stranded DNA, as well as single- and double-stranded RNA. Exemplary nucleic acids include, without limitation, gDNA; hnRNA; mRNA; rRNA, tRNA, micro RNA (miRNA), small interfering RNA (siRNA), small nucleolar RNA (snORNA), small nuclear RNA (snRNA), and small temporal RNA (stRNA), and the like, and any combination thereof.

"Polypeptide" as used herein refers to a singular "polypeptide" as well as plural "polypeptides," and includes any chain or chains of two or more amino acids. Thus, as used herein, terms including, but not limited to "peptide," "dipeptide," "tripeptide," "protein," "enzyme," "amino acid chain," and "contiguous amino acid sequence" are all encompassed within the definition of a "polypeptide," and the term "polypeptide" can be used instead of, or interchangeably with, any of these terms. The term further includes polypeptides that have undergone one or more post-translational modification(s), including for example, but not limited to, glycosylation, acetylation, phosphorylation, amidation, derivatization, proteolytic cleavage, post-translation processing, or modification by inclusion of one or more non-naturally occurring amino acids.

Conventional nomenclature exists in the art for polynucleotide and polypeptide structures. For example, one-letter and three-letter abbreviations are widely employed to describe amino acids: Alanine (A; Ala), Arginine (R; Arg), Asparagine (N; Asn), Aspartic Acid (D; Asp), Cysteine (C; Cys), Glutamine (Q; Gln), Glutamic Acid (E; Glu), Glycine (G; Gly), Histidine (H; His), Isoleucine (I; Ile), Leucine (L; Leu), Methionine (M; Met), Phenylalanine (F; Phe), Proline (P; Pro), Serine (S; Ser), Threonine (T; Thr), Tryptophan (W; Trp), Tyrosine (Y; Tyr), Valine (V; Val), and Lysine (K; Lys). Amino acid residues described herein are preferred to be in the "l" isomeric form. However, residues in the "d" isomeric form may be substituted for any l-amino acid residue provided the desired properties of the polypeptide are retained.

"Protein" is used herein interchangeably with "peptide" and "polypeptide," and includes both peptides and polypeptides produced synthetically, recombinantly, or in vitro and peptides and polypeptides expressed in vivo after nucleic acid sequences are administered into a host animal or human subject. The term "polypeptide" is preferably intended to refer to any amino acid chain length, including those of short peptides from about 2 to about 20 amino acid residues in length, oligopeptides from about 10 to about 100 amino acid residues in length, and longer polypeptides including from about 100 amino acid residues or more in length. Furthermore, the term is also intended to include enzymes, i.e., functional biomolecules including at least one amino acid polymer. Polypeptides and proteins of the present invention also include polypeptides and proteins that are or have been post-translationally modified, and include any sugar or other derivative(s) or conjugate(s) added to the backbone amino acid chain.

The term "naturally occurring" as used herein as applied to an object refers to the fact that an object can be found in nature. For example, a polypeptide or polynucleotide sequence that is present in an organism (including viruses) that can be isolated from a source in nature and which has not been intentionally modified by the hand of man in a laboratory is naturally-occurring. As used herein, laboratory strains of rodents that may have been selectively bred according to classical genetics are considered naturally occurring animals.

"Phosphomimetic" as used herein refer to amino acid substitutions that biologically mimic a phosphorylated protein to activate (or in some cases deactivate) the protein. These amino acid substitutions form a phosphomimetic mutant protein. Both glutamic acid and aspartic acid are successful phosphomimetics. The most commonly modified amino acids include threonine, serine, and tyrosine. In some embodiments, the phosphomimetic mutant may have at least one point mutation in the sequence of the natural peptide. In some embodiments, the point mutation may be the substitution of an aspartic acid for a serine at position 24 and/or 57 (S24D and/or S57D) in an Hsp22 protein.

The terms "small heat shock protein 22" or "sHsp22" or "Hsp22" are used interchangeably herein and refer to a 22 kDa heat shock protein and nucleic acid genetic code for the protein, existing in either RNA or DNA form. The protein is a highly conserved, ATP-independent molecular chaperone that is highly expressed and responds quickly to stressful conditions, like pH changes and oxidation. Hsp22 is activated through phosphorylation in the N-terminal domain and acts in conjunction with other chaperones to maintain homeostasis. As used herein, Hsp22 is considered an agent.

The dosing of compounds and compositions to obtain a therapeutic or prophylactic effect is determined by the circumstances of the patient, as known in the art. The dosing of a patient herein may be accomplished through individual or unit doses of the compounds or compositions herein or by a combined or prepackaged or pre-formulated dose of a compounds or compositions. An average 40 g mouse has a brain weighing 0.416 g, and a 160 g mouse has a brain weighing 1.02 g, a 250 g mouse has a brain weighing 1.802 g. An average human brain weighs 1508 g, which can be used to direct the amount of therapeutic needed or useful to accomplish the treatment described herein.

The amount of the Hsp22 composition will depend on absorption, distribution, metabolism, and excretion rates as well as other factors known to those of skill in the art. Dosage values may also vary with the severity of the condition to be alleviated. The composition may be administered once, or may be divided and administered over intervals of time. It is to be understood that administration may be adjusted according to individual need and professional judgment of a person administrating or supervising the administration of the compositions used in the present invention.

The dose of the compositions administered to a subject may vary with the particular composition, the method of administration, and the particular disorder being treated. The dose should be sufficient to affect a desirable response, such as a therapeutic or prophylactic response against a tauopathy.

Dosing frequency includes, but is not limited to, at least about once every three weeks, once every two weeks, once a week, twice a week, three times a week, four times a week, five times a week, six times a week, or daily. In some embodiments, the interval between each administration is less than about a week, such as less than about any of 6, 5, 4, 3, 2, or 1 day. In some embodiments, the interval between each administration is constant. For example, the administration can be carried out daily, every two days, every three days, every four days, every five days, or weekly. In some embodiments, the administration can be carried out twice daily, three times daily, or more frequent. Administration can also be continuous and adjusted to maintaining a level of the compound within any desired and specified range.

The administration of the compositions can be extended over an extended period of time, such as from about a month or shorter up to about three years or longer. For example, the dosing regimen can be extended over a period of any of about 2, 3, 4, 5, 6, 7, 8, 9, 10, 11, 12, 18, 24, 30, and 36 months. In some embodiments, there is no break in the dosing schedule. In some embodiments, the interval between each administration is no more than about a week.

The compositions used in the present invention may be administered individually, or in combination with or concurrently with other therapeutics for tauopathic neurodegenerative disorders.

The pharmaceutical compositions of the subject invention can be formulated according to known methods for preparing pharmaceutically useful compositions. As used herein, the phrase "pharmaceutically acceptable carrier" means any of the standard pharmaceutically acceptable carriers. The pharmaceutically acceptable carrier can include diluents, adjuvants, and vehicles, as well as implant carriers, and inert, non-toxic solid or liquid fillers, diluents, or encapsulating material that does not react with the active ingredients of the invention. Examples include, but are not limited to, phosphate buffered saline, physiological saline, water, and emulsions, such as oil/water emulsions. The carrier can be a solvent or dispersing medium containing, for example, ethanol, polyol (for example, glycerol, propylene glycol, liquid polyethylene glycol, and the like), suitable mixtures thereof, and vegetable oils. Formulations are described in a number of sources that are well known and readily available to those skilled in the art. For example, *Remington's Pharmaceutical Sciences* (Martin E W [1995] Easton Pennsylvania, Mack Publishing Company, 19$^{th}$ ed.) describes formulations which can be used in connection with the subject invention.

Evidence has demonstrated chaperones have many physiologically important roles in the cell, that help maintain homeostasis, by helping decide if proteins get degraded or retained, like tau and other amyloid like proteins. (Miyata, Y., et al., *Molecular chaperones and regulation of tau quality control: strategies for drug discovery in tauopathies*. Future Med Chem, 2011. 3(12): p. 1523-37). The inventors have previously shown that overexpression of Hsp27 in vivo was able to slow down aggregation of tau in a transgenic mouse model of tauopathy. (Abisambra, J. F., et al., *Phosphorylation dynamics regulate Hsp27-mediated rescue of neuronal plasticity deficits in tau transgenic mice*. J Neurosci, 2010. 30(46): p. 15374-82).

Prior work has shown Hsps such as Hsp27 is capable of increasing learning and synaptic plasticity by interacting and help clearing tau. Hsp27 has also been seen to have protective roles in the brain after induced strokes by rendering resistance to excitotoxicity and preventing neuronal death by interfering with apoptosis, through the mitochondrial release of cytochrome c. (Latchman, D. S., *Protective effect of heat shock proteins in the nervous system*. Curr Neurovasc Res, 2004. 1(1): p. 21-7; Sharp, F. R., X. Zhan, and D. Z. Liu, *Heat shock proteins in the brain: role of Hsp70, Hsp 27, and HO-1 (Hsp32) and their therapeutic potential*. Transl Stroke Res, 2013. 4(6): p. 685-92).

Here, the inventors found that overexpression of Hsp22 (both wild-type and the phosphomimetic mutant) improved cognition and significantly rescued long-term potentiation in an Alzheimer's mouse model. No significant change in tau levels were caused by Hsp22 overexpression. Overall, Hsp22 overexpression is improving neuronal plasticity and cognition independently of tau. Surprisingly, overexpression of the phosphomimetic mutant mtHsp22 significantly improved long-term potentiation and increased synaptic plasticity above that shown for wtHsp22. This indicates that mtHsp22 may be stimulating other pathways. Thus, Hsps have the capability to act through different pathways, managing a variety of clients and possibly inducing various response that can help maintain neuronal health.

The present invention provides a novel method of improving cognition, learning and memory by increasing synaptic plasticity. The examples provided herein illustrate various exemplary embodiments of the invention and are meant to be construed in a nonlimiting sense.

EXAMPLE 1—MOUSE STUDIES

The inventors found mice overexpressing mtHsp22 were able to significantly learn platform location after the third-day reversal trial compared to the transgenic GFP control mice. This suggests mtHsp22 overexpression enhances learning and memory.

The inventors also examined the physiological differences when overexpressing wtHsp22 and mtHsp22 in both transgenic and wildtype mice through the use of LTP. They observed mtHsp22 was raised and maintained significantly in hippocampal slice cultures from transgenic mtHsp22 compared to wtHsp22 and GFP control, thus suggesting an increase in synaptic strength in mtHsp22 overexpressed mice. Surprisingly, when tested for tau pathology there was no significant effect on total tau, pS262, pT231 and T22 in the hippocampus compared to GFP control.

The inventors also tested for T22 and Gallyas and observed a significant difference compared to GFP control, thus suggesting the pro-cognitive effect being observed through mtHsp22 overexpression is tau independent.

Finally, the inventors tested other pathways mtHsp22 could be stimulating, based on literature, that could lead to the effect being observed. Nonetheless, after testing for p62 and DCX, a significant change between Hsp22 and GFP control was not observed. In addition to testing autophagy and neurogenesis the inventors processed brain lysates and analyzed them through mass spectrometry.

Previously sHsps have been shown to have increased expression with aging. Hsp22 (HSPB8) specifically has been shown to have a protective role during aging in *Drosophila melanogaster* and in human cells by helping regulate mitochondrial integrity. (Morrow, G. and R. M. Tanguay, *Drosophila melanogaster Hsp22: a mitochondrial small heat shock protein influencing the aging process*. Front Genet, 2015. 6: p. 1026). Hsp22 has also been shown to act a as a chaperone in protein clearance through chaperone-assisted selective autophagy (CASA) with co-chaperone BAG3, Hsp70 and p62. (Carra, S., S. J. Seguin, and J. Landry, *HspB8 and Bag3: a new chaperone complex targeting misfolded proteins to macroautophagy*. Autophagy, 2008. 4(2): p. 237-9).

It is possible that the phenotypic effect observed herein may be regulated by Hsp22 through other pathways. The fact that a direct effect was not observed when staining for p62, suggests that Hsp22 overexpression did not upregulate the sequestrome. However, Hsp22 may have assisted in clearing other proteins through the CASA pathway which in turn promoted synaptic plasticity. This suggests that Hsps have the capability to act through different pathways, managing a variety of clients and possibly inducing various response that can help maintain neuronal health.

Since literature has shown that these Hsps have the versatility in achieving homeostasis through different methods, the inventors examined if further regulation by phosphorylation affected functionality.

The inventors observed the phosphomimic mutants (S24D and S57D) had a difference in effect compared to the wtHsp22. This difference was surprising since the mutant was used to determine similar effects to previous observations with the Hsp27 mutant. Hsp27 forms high ended homooligomers which self-regulate chaperoning activity by self-interacting. When there is stress, i.e. phosphorylation or high concentration of clients or co-chaperones, the homooligomer opens up and interacts with the client.

To simulate this stress, phosphomimetics were created by making a point mutation converting a serine to an aspartic acid, replicating a similar negative charge found in a phosphorylated serine. When this was done for Hsp27, there was activity for both the wtHsp27 and mtHsp27 in vitro, however in vivo there was accumulation of the client in the mtHsp27. This result suggested that self-regulation was necessary for Hsp27 chaperoning activity.

Surprisingly, when mtHsp22 and wtHsp22 were tested, there was a difference in observed effects. mtHsp22 displayed a more significant effect in vivo than wtHsp22, which suggests that Hsp22 chaperoning activity could not be as tightly self-regulated as Hsp27 when phosphorylated in regard to tau. The results also suggest that Hsp22 is more involved and active in a phosphorylated state.

Literature has shown Hsp22 can be phosphorylated by various kinases, and in multiple sites. ERK1 for example has been shown to phosphorylate 524, S27 and T87. Phosphomimetics of these particular sites have shown to affect concentration-dependent association of Hsp22 subunits, and in extent chaperoning activity. (Shemetov, A. A., A. S. Seit-Nebi, and N. B. Gusev, *Phosphorylation of human small heat shock protein HspB8 (Hsp22) by ERK1 protein kinase*. Mol Cell Biochem, 2011. 355(1-2): p. 47-55).

It is possible the observed phenotypic effect with the increased synaptic plasticity may be caused by a genotypic effect that is then being rescued by the overexpression of mtHsp22 independently of tau. Alternatively, the effect may be an indirect effect being caused by the pathogenicity of the tau transgenic model that is being rescued by overexpressed mtHsp22.

In the case of a genotype effect, it is known that the rTg4510 mice have a caveat in which the CaMKIIα-tTa and the MAPTP301L transgenes both disrupt endogenous mouse genes as well as have a shrinkage of the dentate gyrus, meaning not all phenotypes are due to the tau$^{P301L}$ overexpression. (Han, H. J., et al., *Strain background influences neurotoxicity and behavioral abnormalities in mice expressing the tetracycline transactivator.* J Neurosci, 2012. 32(31): p. 10574-86).

Regarding indirect effects, tau has been shown to cause a network of pathogenic problems in the brain, resulting in synaptic dysfunction, neuronal toxicity, and eventually neuronal death. Specifically, there is evidence that shows aberrant tau$^{P301L}$ proteins are mislocalized to dendritic spines in Tg4510 mice, and this localization causes impaired synaptic function due to reduction of AMPA and NMDA receptors. (Hoover, B. R., et al., *Tau mislocalization to dendritic spines mediates synaptic dysfunction independently of neurodegeneration.* Neuron, 2010. 68(6): p. 1067-81). Thus, mtHsp22 overexpression can be acting through kinases like PI3K and AMPK signaling pathways to rescue synaptic plasticity by increasing postsynaptic receptors. (Buonarati, O. R., et al., *Mechanisms of postsynaptic localization of AMPA-type glutamate receptors and their regulation during long-term potentiation.* Sci Signal, 2019. 12(562)).

More evidence suggests, after mass spectrometry analysis, there was an activation of the RAS signaling pathway in particular NRAS for the mutant Hsp22 compared to the GFP control in the transgenic genotype. This is interesting since NRAS has been shown to regulate proliferation and sustainability in various cell types, plausibly positively adding another layer of cellular viability. (Li, Q., et al., *Oncogenic Nras has bimodal effects on stem cells that sustainably increase competitiveness.* Nature, 2013. 504(7478): p. 143-147; Shen, S. W., et al., *Mutant N-ras preferentially drives human CD34+ hematopoietic progenitor cells into myeloid differentiation and proliferation both in vitro and in the NOD/SCID mouse.* Exp Hematol, 2004. 32(9): p. 852-60).

Another transcriptional activator that was significantly regulated by the mutant Hsp22 Transgenic mouse, was STAT1. Proteomics here showed that STAT1 was being inhibited, which is interesting since there is evidence that demonstrates STAT1 activation leads to disruption of hippocampal neurogenesis, as well as neuroinflammation. (Borsini, A., et al., *Interferon-Alpha Reduces Human Hippocampal Neurogenesis and Increases Apoptosis via Activation of Distinct STAT1-Dependent Mechanisms.* Int J Neuropsychopharmacol, 2018. 21(2): p. 187-200; Kaplan, M. H., *STAT signaling in inflammation.* JAKSTAT, 2013. 2(1): p. e24198). Moreover mtHsp22 is regulating transcriptional factors that can lead to neuronal protection, by regulating inflammation, proliferation, and protein turn-over.

Results mtHsp22 Preserves Learning and Memory in rTg4510 Tau Transgenic Mice

In order to understand the effects of Hsp22 overexpression on tau in the brain, 4-month-old rTg4510 tau transgenic and wild-type mice were injected intracranially in the hippocampus and frontal cortex with AAV9 expressing wtHsp22, phosphomimetic mtHsp22, or GFP control. After 3 months of expression, mice were tested for spatial learning and memory, since rTg4510 mice have impairments in this task, which may be relevant to cognitive deficits found in AD patients. To do this, the inventors utilized the two day radial arm water maze (RAWM) task with reversal. The inventors found that Hsp22 overexpression improved reversal spatial learning in rTg4510 mice (FIG. 1A), where mtHsp22 overexpression significantly lowered the number of errors in rTg4510 mice compared to GFP controls, and mice with wtHsp22 overexpression showed fewer errors than GFP controls, but did not reach significance (p=0.07). Wild-type mice from each treatment group were indistinguishable from each other, suggesting the improvement in rTg4510 mice was not just a precognitive effect, but a rescue of a tau-mediated deficit. To determine if changes in motor behavior had any effect on the RAWM results and to see if anxiolytic-like behavior was impacted in these mice, the inventors performed an Open Field test, which showed no change in the mice based on treatment or genotype (FIG. 1, B and C).

wtHsp22 and mtHsp22 Overexpression Rescue LTP Deficits in rTg4510

The inventors prior work identified the chaperone Hsp27 as having protective effects in synaptic activity in rTg4510 mice. (Abisambra 2010). Here, the inventors examined if Hsp22 overexpression caused a similar rescue. To do this, after behavioral testing was complete, hippocampal ex vivo slices were prepared from a group of the mice for electrophysiological analysis. Similar to the prior findings with wtHsp27 overexpression, wtHsp overexpression significantly rescued long-term potentiation (LTP) in rTg4510 mice compared to GFP controls (FIG. 2A). However, different from Hsp27, where the phosphomimetic mutant did not provide any benefit, mtHsp22 further significantly improved LTP induction and maintenance in rTg4510 mice compared with wtHsp22 and GFP injected mice. This increase in LTP was not found in wildtype mice (FIG. 2B), which suggests that Hsp22 overexpression was rescuing a tau-mediated deficit and not causing a general improvement in LTP. To determine if this benefit was caused by a specific upregulation in presynaptic or postsynaptic signaling, the inventors analyzed the ratio of the input stimulus to evoke output signal. The Input/Output (I/O) showed that the fiber volley and the slope of the EPSP (fEPSP) were not affected by genotype or treatment (FIG. 2, C and D), which indicates the wtHsp22 and mtHsp22 mediated rescues in rTg4510 mice were not due to changes in basal synaptic transmission or presynaptic activity.

Neuronal Overexpression of wtHsp22 and mtHsp22 does not Change Tau Levels or Phosphorylation Status The inventors examined if the behavioral and electrophysiological benefits caused by wtHsp22 and mtHsp22 overexpression in tau transgenic mice were caused by altered tau accumulation. The inventors have previously shown Hsp22 can affect tau levels and aggregation in vitro. (Webster 2020). Using immunohistochemistry, the inventors probed for total tau (FIG. 3, A and B) and phospho-tau pS262 (FIG. 3, C and D) and pT231 (FIG. 3, E and F) in the hippocampus of rTg4510 mice, which revealed that overexpression of wtHsp22 or mtHsp22 did not alter total tau levels or phosphorylation at these epitopes.

The inventors also measured the levels of silver-positive tau by Gallyas method and T22-positive tau oligomers, which also showed no significant change by Hsp22 overexpression.

Since tau accumulation remained unaffected, the inventors interrogated the levels of proteins associated with autophagy and neurogenesis, since these have been shown to be linked to Hsp22 and synaptic plasticity. The inventors first measured levels of p62, an autophagy receptor that accumulates when autophagy is inhibited and with Hsp22 expression, but differences in p62 were only found by genotype, not treatment (FIGS. 4C and D). It was found that p62 levels were significantly elevated in the hippocampus of rTg4510 mice compared to wild-type mice, but was not affected by wtHsp22 or mt Hsp22 expression. The inventors also stained for doublecortin (DCX), a marker of neurogenesis and neuronal migration that has been shown to associate with Hsp22, but DCX levels were not significantly changed in the dentate gyrus of mice regardless of genotype or treatment (FIGS. 4A and B).

Mass Spectrometry Showed Overexpression of Hsp22 Regulated Inflammation and Transcription Factors To further elucidate the links Hsp22 overexpression could be modulating, mass spectrometry was done on brain tissue lysates. Surprisingly many hits were linked to inflammation (i.e., IL6 and TNF), as well as transcription factors (i.e., STAT1) when comparing mtHsp22 to GFP control. The inventors validate these results through biochemical assays (i.e. western blot).

Methods

Animals

Procedures involving animal subjects were approved and conducted following the guidelines set by the University of South Florida Institutional Animal Care and Use Committee. The rTg4510 and parental mice were maintained and genotyped as described previously (Santacruz et al., 2005). For immunohistochemistry experiments, mice (three females and three males for all groups except WT/wtHsp22; three females and four males) were injected with AAV9-expressing vectors at 4 months, and their brains were harvested 2 months after injection. At least four sections were analyzed for each group of mice. Number of mice analyzed: $n_{wtHsp22}$=6, $n_{mtHsp22}$=6, $n_{GFP}$=6. Statistical significance was determined with one-way ANOVA. Also, mice (four females and four males for all groups) were injected with AAV9-expressing vectors at 4 months, and their brains were harvested 2 months after injection for electrophysiology experiments. At least eight sections were analyzed for each group of mice. Number of mice analyzed: $n_{wtHsp22}$=8, $n_{mtHsp22}$=8, $n_{GFP}$=8.

Surgical procedure was performed as described previously in Carty, herein incorporated by reference, with some alterations. (Carty, N.C., et al., *Adeno-associated Viral (AAV) Serotype 5 Vector Mediated Gene Delivery of Endothelin-converting Enzyme Reduces Abeta Deposits in APP+PS1 Transgenic Mice*. Mol Ther, 2008. 16(9): p. 1580-1586). Following analgesic, mice were anesthetized, with isoflurane. An incision on the skin was made along the medial sagittal plane. Injection sites was drilled through cranium measured with robotic stereotaxic apparatus (Neurostar) bilaterally in the frontal cortex: bregma: −1.5 mm anteroposterior, ±2 mm bilateral, and +3.0 mm vertical and hippocampus: X=±3.6 mm, Y=−3.5 mm, and Z=+2.68 from bregma. 2 µl of each of the viral vectors in sterile PBS at a concentration of greater than $10^{12}$ vg/ml was injected at a rate of 5 µl/min using convection-enhanced delivery (CED). (Bobo, R. H., et al., *Convection-enhanced delivery of macromolecules in the brain*. Proc Natl Acad Sci USA, 1994. 91(6): p. 2076-80). After 2 minutes the needle was removed from site, and the incision was closed with wound clips. Since the inventors were studying learning and memory and locomotion, they examined the hippocampus and part of the cerebellum. All mice were used for behavior and half the mice were used for electrophysiology and the other half were used for immunohistochemistry and mass spec/biochemistry.

Radial-Arm Water Maze with Reversal and Open Field

To evaluate spatial learning and memory, at 6 months of age, mice WT (N=31; 15 females and 16 males), rTg4510 (N=30; 15 females and 15 males) were evaluated by the hippocampal dependent-Radial Arm Water Maze. In this task, mice are trained and tested to locate a hidden escape platform in a 6-arm Radial Arm Water Maze with spatial cues around the room over the course of three days with a submergible platform. On day one, 12 trials were run in four blocks of three. After each three-trial block a second group of mice were ran, allowing for rest period before mice were exposed to second block of three trials. The platform arm was different for each mouse to minimize odor cues. The start arm was varied for each trial, while keeping platform arm constant for individual mouse in day one and two. For the first day, the platform was hidden every other trial. Day two, mice were run the same way, but the platform will always be hidden. Day three, mice were run in the same way, but the platform was moved to another arm (Reversal) and was hidden. Number of errors (incorrect arm entries) was measured in a one-minute time frame. Mice will also be given an error if failed to make an arm choice within 20 seconds. Blind numbers were assigned to each mouse to eliminate biases, and, to minimize individual trial variability, each the errors for three consecutive trials for each mouse was averaged producing four data points for each day. Statistical analysis was determined by two-way ANOVA.

For open field (used to detect locomotion and anxiety), 6-month-old WT (N=31; 15 females and 16 males), rTg4510 (N=30; 15 females and 15 males) mice were monitored for 10 minutes in an open field (Stoelting). Activity, regarding total distance and time spent in the center was recorded and analyzed using ANY-maze video tracking software (Stoelting). Statistical analysis was determined by one-way ANOVA.

Immunohistochemistry

For immunohistochemistry, a subset of AAV-injected mice WT (N=6; 3 females and 3 males/AAV), rTg4510 (N=6; 3 females and 3 males/AAV) were harvested as described by Dickey et al., herein incorporated by reference into this disclosure. (Dickey, C., et al., *Aging analysis reveals slowed tau turnover and enhanced stress response in a mouse model of tauopathy*. Am J Pathol, 2009. 174(1): p. 228-38). For tissue collection and processing, mice were overdosed with pentobarbital solution and transcardially perfused with 0.9% saline solution. Brains were extracted and cut along the mid-line. One hemisphere was submerged in 4% paraformaldehyde for immunohistochemistry and the other hemisphere was snap frozen for mass spectrometry and biochemical analysis described below. After the tissue is fixed, it was cryoprotected in successive 24-hour increments of 10%, 20%, and 30% sucrose gradients as described previously in Gordon et al., incorporated by reference into this disclosure. (Gordon, M. N., et al., *Time course of the development of Alzheimer-like pathology in the doubly transgenic PS1+APP mouse*. Exp Neurol, 2002. 173(2): p. 183-95). Brains were frozen in a temperature-controlled freezing stage, horizontally sectioned (25 µm, with a 50 µm section every 8th section) on a sliding microtome and stored in PBS containing 0.02% NaN3 at 4° C. For immunostaining, brain sections were immersed in a solution of 3% $H_2O_2$ for 15 minutes at room temperature to inhibit endogenous peroxidases. Sections were washed and permeabilized in blocking buffer with PBS and (4% goat serum, 1.83% lysine, and 2% Triton X-100) respectively for 30 minutes at room temperature. Sections were incubated overnight at room temperature with anti-Hsp22 antibody at 1:300 dilution (to check for Hsp22 AAV expression), anti-Dako at 1:100,000 dilution (to measure for total tau), anti-pS262 at 1:100 dilution, anti-pT231 at 1:300 dilution (both pS262 and pT231 to check for phosphorylated tau), and GFP for AAV expression. Sections were washed with PBS and incubated with biotinylated anti-rabbit secondary antibody for 2 hours and then with Avidin-Biotin Complex (ABC) for an hour. Peroxidase reactions consist of 1.4 mM diaminobenzidine and nickel with 0.03% $H_2O_2$ in tris-buffered saline for 5 minutes and then washed with PBS. Stained sections were mounted, coverslipped, and imaged.

The inventors used Gallyas silver staining to evaluate the levels of insoluble tau. Tissue sections were mounted on glass slides and left to dry overnight. Sections were submerged in water 30 times. The slides were placed in 5% periodic acid for 5 minutes, followed by washing with distilled water for 10 minutes. Slides were placed in alkaline silver iodide solution (0.053% silver nitrate, 0.6M potassium iodide, 1M sodium hydroxide) for 1 minute, then rinsed with 0.5% acetic acid solution for 10 minutes. Staining was done by adding 3×stock II (25 mM ammonium nitrate, 11.77 mM silver nitrate, 3.4 mM tungstosilicic acid) to 10×stock I (5% sodium carbonate), stirred and then add 7×stock III (25 mM ammonium nitrate, 11.77 mM silver nitrate, 3.4 mM tungstosilicic acid, 0.27% formaldehyde) with mixing for the entire time, while color change is monitored. Slides were washed with 0.5% acetic acid for 3 minutes followed by distilled water for 5 minutes. Slides were placed in 0.1% gold chloride for 5 minutes followed by rinsing with distilled water for 1 minute. Slide were placed in 1% sodium thiosulphate solution for 5 minutes and washed with tap water for 1 minute, rinsed with tap water for 3 minutes. Finally, slide was submerged 8 times in 95% EtOH, 16 times in 100% EtOH and cleared with xylenes for 15 minutes. Slides were coverslipped using DPX.

Slides were scanned in at 20× using the Zeiss axio scanner creating a .czi file. Then NearCyte was used to outline hippocampus and create a segmentation file. The segmentation was created by manually selecting pixels that are positive versus pixels that are not (based on contrast), the inventors then outlined teras, folds, and debris that are not desirable in the analysis. Once all tissue is outlined and segmented, the inventors ran a batch process on the files which will give us a ratio of positive versus non-positive signal.

To evaluate effects on neuronal health, stereology was performed. Sections were stained with neuronal marker NeuN, as described above, but only using PBS and DAB so the staining was brown. Tissues were mounted and counterstained by cresyl violet and coverslipped. Neurons stained with NeuN and cresyl violet were counted in the Dentate Gyrus (DG) using optical fractionator method of stereological counting with stereological software (Stereologer; SRC). (West, M. J., L. Slomianka, and H. J. Gundersen, *Unbiased stereological estimation of the total number of neurons in the subdivisions of the rat hippocampus using the optical fractionator*. Anat Rec, 1991. 231(4): p. 482-97). A systematic random sampling of sections was coded within the DG that is defined based on a mouse brain atlas to maintain consistency. A computer-generated grid was placed randomly over the area of interest and cells were counted within three-dimensional optical dissectors if they are within the dissector or touching the green lines and were excluded if they are outside the dissector or touching the red lines. Section thickness was measured in all sections to estimate mean section thickness for each animal after tissue processing. Statistical analysis was determined by One-way ANOVA.

To determine if Hsp22 overexpression was affecting autophagy and neurogenesis in these mice, immunohistochemical staining was done on an autophagy and neurogenesis marker. For immunohistochemical staining, the same procedure was used as previously described above, with sections incubated overnight at room temperature with p62 (autophagy) at 1:300 dilution and DCX (neurogenesis) at 1:1000 dilution. (Liu, W. J., et al., *p62 links the autophagy pathway and the ubiquitin-proteasome system upon ubiquitinated protein degradation*. Cell Mol Biol Lett, 2016. 21: p. 29; Couillard-Despres, S., et al., *Doublecortin expression levels in adult brain reflect neurogenesis*. Eur J Neurosci, 2005. 21(1): p. 1-14).

Electrophysiology

Following behavioral analyses, a subset of AAV-injected mice were evaluated for electrophysiological changes using long-term potentiation. To do this, brains were removed and submerged in cold cutting buffer (0.6 mM ascorbate, 5 mM D-glucose, 0.5 mM CaCl2), 28 mM NaHCO3, 1.25 mM NaH2PO4, 3 mM KCl, 60 mM NaCl, 110 mM sucrose). Buffers were gassed with 95% 02 and 5% CO2. The brain was sectioned at 400 m for hippocampal slices using a vibratome. The slices were allowed to reach room temperature and equilibrate in a 50% cutting saline and 50% artificial CSF (ACSF) in 125 mM NaCl, 2.5 mM KCl, 1.24 mM $NaH_2PO_4$, 25 mM $NaHCO_3$, 10 mM D-glucose, 2 mM $CaCl_2$), 1 mM $MgCl_2$ for 10 minutes. Slices were allowed to recover for at least an hour and a half before assay is started. Slices were then perfused in ACSF at 1 mL/min, and field EPSPs (fEPSPs) were obtained from schaffer collaterals. The slices were stimulated with a bipolar Teflon-coated platinum electrode, and recordings were obtained with use of a glass microelectrode filled with ACSF (resistance of 1-4 mΩ). fEPSP were generated using a 0.1 ms biphasic pulse every 20 seconds. After a consistent pulse is determined for a 5-10-minute period, threshold voltage for evoking a fEPSP is established, the voltage was raised 0.5 mV until maximum amplitude of the fEPSP is reached. This helped create the input/output (I/O) curve. Then the fEPSP baseline response, was defined at 50% of the stimulus voltage used to produce maximum fEPSP response (amplitude) as seen in the I/O curve. Baseline was recorded for 20 minutes, and tetanus (Theta-burst stimulation) was used to create CA1 long-term potentiation (LTP). Theta-burst stimulation (TBS) was defined as 5 trains of 4 pulse bursts at 200 Hz separated by 200 ms, repeated 6 times with an intertrain interval of 10 seconds. After TBS is performed, regular fEPSP was recorded for 60 minutes. The potentiation signal was measured as the normalized increase of the mean fEPSP descending slope for the duration of the recording. Statistical analysis was determined by Two-way ANOVA.

Mass Spectrometry

Hippocampal brain lysates were prepared for suspension trap (S-trap) proteomics. Lysates were lysed in 10 μL/mg of ABC buffer (50 mM ammonium bicarbonate, pH 7.55, 5% SDS, with Protease Inhibitor Cocktail EDTA free, phenylmethylsulfonyl fluoride, protease inhibitor 2 and protease inhibitor 3 all with a 1:100 dilution) and sonicated 2 times (20% amplitude, 5 seconds on, 5 seconds off for 15 seconds), while on ice. Samples were spun at 13,000 g for 15 minutes at 4° C. Samples were reduced with a final concentration of 20 mM DTT, heated at 95° C. for 10 minutes, then cooled before alkylating cysteines with the addition of 40 mM iodoacetamide, final concentration. Samples were incubated in the dark for 20 minutes at room temperature, followed by removal of undissolved matter by centrifugation at 17,000 g for 10 minutes. The clear supernatant was transferred to a new tube followed by the addition of 12% aqueous phosphoric acid at 1:10 dilution for the final concentration of 1.2% phosphoric acid. Six times the volume of S-trap binding buffer (90% aqueous methanol, 100 mM Tris, pH 7.1) was added to acidified protein and then mixed well. The S-trap microcolumn was placed in a 1.7 mL tube in order to retain flow-through. The sample mixture was added to micro column 200 µL at a time, followed by centrifugation of micro column 4,000 g for 2 minutes, then flow-through was removed when needed and this process was repeated until all sample has gone through the column. The protein bound within the column was washed four times with 150 uL of S-trap buffer; with centrifugation and removal of flow-through each time. S-trap was moved to a clean 1.7 mL sample tube for proteolytic digestion where 20 µL of digestion buffer containing 50 mM ABC buffer with lug Trypsin/Lys-C protease (Promega) was added to the microcolumn (to make sure no air bubbles remains between the protease digestion solution and the protein trap, gel loading tips were used). S-trap micro column was capped to limit evaporation loss without forming an airtight seal and incubation in a heat black for 1 hour at 47° C. for trypsin. After digestion, peptides were eluted first with 40 µL of 50 mM ABC and the centrifuged at 4,000 g for 2 mins. An additional 40 uL of 0.2% formic acid in LC-MS graded water was then be added and then centrifuged at 4,000 g for 2 minutes. Finally, to recover hydrophobic peptides, a final elution of 35 uL of 50% acetonitrile containing 0.2% formic acid was added with a final centrifugation at 5,000 g for 5 minutes. All elutes were collected in the same tube, to prevent transfer loss. Eluted peptides were centrifuged under vacuum until dryness and then resuspend in 0.1% formic acid in water. Samples were sonicated 10 minutes in water bath and centrifuged at 17,000 g for 30 minutes to fully pull down any non-soluble particulates before transferring the clarified peptide supernatants into autosampler vials.

The samples will then undergo liquid chromatography-mass spectrometry (LC-MS) analysis. Peptides were analyzed using Thermo Q-Exactive™ HF-X mass spectrometer coupled to a Thermo Easy nLC™ 1200 high pressure liquid chromatography (HPLC) system. Samples were loaded into a precolumn, Acclaim™ PEPMAP™ 100 (75 µM, 2 CM, c18 3 um, 100 A), and the trapped peptides were eluted at 300 nl/minute into an Acclaim™ PEPMAP™ 100 analytical column (75 µm, 25 cm, c18, 100 A) using a 180 minute gradient with an initial starting condition of 2% Buffer B (0.1% formic acid in 90% Acetonitrile) and 98% buffer A (0.1% formic acid in water). Buffer B was increased to 25% over 120 minutes, then raised to 35% after an additional 25 minutes. The gradient was increased up to 98% B over another 25 minutes and high B (98%) was run for 10 minutes afterwards. The MS was outfitted with a Thermo Flex™ source with the following parameters: Spray voltage: 2.24, Capillary temperature: 300 dC, Funnel RF level=40. Parameters for data acquisition were as follows: for MS data the resolution was 60,000 with an AGC target of 3e6 and a max IT time of 50 ms, the rage was set to sequentially search ranges 375-600 m/z, 600-800 m/z, and 800/1200 m/z, selecting up to 20 peaks to further investigate with MS/MS. MS/MS data was acquired with a resolution of 15,000, an AGC of 1e5, max IT of 25 ms, with an isolation window of 1.6 m/z and a dynamic execution of 25 s.

The resulting data was searched using Thermo Proteome Discoverer™ 2.2 software. A fully reviewed Mouse database was downloaded from UniProt which was used in the SEQUEST HT™ search and a custom data base was created using the protein sequences of the viruses used. A full trypsin digestion with a maximum of 2 missed cleavages was selected including a precursor mass tolerance of 10 ppm and a fragment mass tolerance of 0.02 Da. Modifications that were included are oxidation, n-terminal acetylation, and carbamidomethylation. The resulting peptides were filtered for high confidence and validated with a confidence threshold of 0.01 (Target FDR). Data was searched using Max Quant™ software (version 1.6.10.43).

Samples were searched again using a fully reviewed Mouse data base from UniProt combined with common contaminates and concatenated with the reversed version of all sequences using the *Andromeda* search engine integrated into Max Quant, with trypsin as the enzyme, a maximum of two missed cleavages and a minimum of 6 amino acids. FDR thresholds was set to 0.01, the "align across runs" feature was selected with a mass error of 10 ppm and a retention time window of 4 minutes. The label free quant feature was selected for all searches with a minimum ratio of 1, and the resulting data was exported for further analysis.

Statistical Analysis

Statistical analysis was done through One-Way ANOVA and t-test. Graphs and statistical analysis were plotted and completed using GraphPad™ software (Prism).

EXAMPLE 2 (PROPHETIC)

A 65 year old woman presents with increased memory loss and confusion, inability to learn new things, difficulty in organizing thoughts and concentrating, difficulty in performing simple math and the inability to recognize common objects. The patient is diagnosed with Alzheimer's disease.

The patient is administered a therapeutically effective amount of a composition containing Hsp22 protein at a given dosing interval. After a period of time, the patient exhibits increased cognition, learning and memory as compared to her baseline prior to beginning treatment.

CONCLUSION

The inventors have discovered Hsp22 preserves and/or improves synaptic plasticity and long term potentiation, cognition, memory, and learning in the tauopathic brain. This increase occurs independently of altering tau levels or tau phosphorylation status. Both wild type and a phosphomimetic mutant of Hsp22 can be administered to a patient and used to treat tauopathies and lessen the symptoms associated with tauopathies, such as Alzheimer's disease, by improving cognition, learning and memory independently of tau accumulation or phosphorylation.

The sequence listing entitled "Method of Using SHSP22 to Improve Cognition and Learning in the Tauopathic Brain" in XML format, created on Aug. 4, 2023 and being 4,000 bytes in size, is hereby incorporated by reference into this disclosure.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

It is also to be understood that the following claims are intended to cover all of the generic and specific features of the invention herein described, and all statements of the scope of the invention that, as a matter of language, might be said to fall therebetween.

What is claimed is:

1. A method of reducing cognitive impairment in comparison to a baseline in a patient with Alzheimer's disease (AD), wherein the patient with AD has cognitive impairment that is caused by expression of a P301L mutation in a microtubule-associated protein tau (MAPT) protein, the method comprising: intracranially administering to the patient a composition comprising a therapeutically effective amount of an adeno-associated viral serotype 9 (AAV9) vector comprising a polynucleotide encoding a phosphomimetic (S/D) heat shock protein 22 (Hsp22) mutant (AAV9-mtHsp22), the phosphomimetic Hsp22 mutant comprising the amino acid sequence of SEQ ID NO:2 with point mutations substituting serine 24 and serine 57 with aspartate S24D and S57D so as to overexpress the phosphomimetic Hsp22 mutant in the patient's brain, wherein the therapeutically effective amount is an amount effective to reduce cognitive impairment in the AD patient without altering tau protein levels or tau phosphorylation status in the patient's brain compared to the AD patient with no treatment.

2. The method of claim 1, wherein the AAV9 vector is administered via bilateral stereotactic injection into the hippocampus and frontal cortex of the patient's brain.

3. The method of claim 1, wherein the polynucleotide encoding the phosphomimetic Hsp22 mutant is operably linked to a hybrid cytomegalovirus/chicken β-actin (CMV/CBA) promoter in the AAV9 vector.

4. The method of claim 1, wherein the AAV9 vector is administered at a viral titer of at least $1 \times \times 10^{12}$ vector genomes per milliliter at each injection site.

5. The method of claim 1, wherein reducing cognitive impairment comprises reducing spatial learning and memory impairment in the patient.

6. A method of increasing synaptic plasticity and long term potentiation (LTP) as compared to a baseline in a patient with Alzheimer's disease (AD), wherein the patient with AD has impairment of synaptic plasticity and LTP that is caused by expression of a P301L mutation in a MAPT protein, the method comprising: intracranially administering to the patient a therapeutically effective amount of an adeno-associated viral serotype ((AAV9) vector comprising a polynucleotide encoding a phosphomimetic (S/D) Hsp22 mutant (AAV9-mtHsp22) as defined in claim 1; wherein the therapeutically effective amount is an amount effective to increase synaptic plasticity and LTP in the AD patient without altering tau protein levels or tau phosphorylation status in the patient's brain compared to the AD patient with no treatment.

7. The method of claim 6, wherein the AAV9 vector is administered via bilateral stereotactic injection into the hippocampus and frontal cortex of the patient's brain.

8. The method of claim 6, wherein the polynucleotide encoding the phosphomimetic Hsp22 mutant is operably linked to a hybrid CMV/CBA promoter in the AAV9 vector.

9. The method of claim 6, wherein the AAV9 vector is administered at a viral titer of at least $1 \times 10^{12}$ vector genomes per milliliter at each injection site.

10. The method of claim 6, wherein increasing synaptic plasticity and LTP comprises enhancing both induction and maintenance phases of hippocampal long-term potentiation in the patient.

11. A method of reducing memory impairment as compared to a baseline in a patient with Alzheimer's disease (AD), wherein the patient with AD has memory impairment that is caused by expression of a P301L mutation in a MAPT protein, the method comprising: intracranially administering to the patient a composition comprising a therapeutically effective amount of an adeno-associated viral serotype (AAV9) vector comprising a polynucleotide encoding a phosphomimetic (S/D) Hsp22 mutant (AAV9-mtHsp22) as defined in claim 1; wherein the therapeutically effective amount is an amount effective to reduce memory impairment in the AD patient without altering tau protein levels or tau phosphorylation status in the patient's brain compared to the AD patient with no treatment.

12. The method of claim 11, wherein the AAV9 vector is administered via bilateral stereotactic injection into the hippocampus and frontal cortex of the patient's brain.

13. The method of claim 11, wherein the polynucleotide encoding the phosphomimetic Hsp22 mutant is operably linked to a hybrid CMV/CBA promoter in the AAV9 vector.

14. The method of claim 11, wherein the AAV9 vector is administered at a viral titer of at least $1 \times 10^{12}$ vector genomes per milliliter at each injection site.

15. The method of claim 11, wherein reducing memory impairment comprises reducing deficits in spatial memory retention and learning ability in the patient.

* * * * *

UNITED STATES PATENT AND TRADEMARK OFFICE
CERTIFICATE OF CORRECTION

| | | |
|---|---|---|
| PATENT NO. | : 12,465,656 B1 | Page 1 of 1 |
| APPLICATION NO. | : 17/179846 | |
| DATED | : November 11, 2025 | |
| INVENTOR(S) | : Laura Jenelle Blair and Paula C. Bickford | |

It is certified that error appears in the above-identified patent and that said Letters Patent is hereby corrected as shown below:

In the Claims

Column 23, Claim 4, Line 59 replace "1××10^12" with -- "1×10^12" --

Signed and Sealed this
Twenty-third Day of December, 2025

John A. Squires
*Director of the United States Patent and Trademark Office*